(12) United States Patent
Vos

(10) Patent No.: US 8,843,738 B2
(45) Date of Patent: Sep. 23, 2014

(54) TLS ABBREVIATED SESSION IDENTIFIER PROTOCOL

(75) Inventor: Gustav Gerald Vos, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 13/471,390

(22) Filed: May 14, 2012

(65) Prior Publication Data

US 2013/0305036 A1 Nov. 14, 2013

(51) Int. Cl.
*H04L 29/06* (2006.01)

(52) U.S. Cl.
USPC .......... 713/151; 709/205; 709/217; 709/223; 709/224; 709/228; 709/238

(58) Field of Classification Search
USPC ......... 709/224, 227, 228, 205, 217, 223, 238; 713/150, 151
See application file for complete search history.

(56) References Cited

U.S. PATENT DOCUMENTS

| | | |
|---|---|---|
| 6,836,474 B1 | 12/2004 | Larsson et al. |
| 7,426,636 B1 | 9/2008 | McGrew et al. |
| 7,529,933 B2 | 5/2009 | Palekar et al. |
| 7,587,598 B2 | 9/2009 | Ohba et al. |
| 7,600,113 B2 | 10/2009 | Kuehnel et al. |
| 7,870,380 B2 | 1/2011 | VanHeyningen et al. |
| 7,917,758 B2 | 3/2011 | Palekar et al. |
| 8,145,768 B1 * | 3/2012 | Hawthorne .................... 709/228 |
| 2002/0007415 A1 * | 1/2002 | Douglis et al. ................ 709/230 |
| 2010/0189103 A1 | 7/2010 | Bachmann et al. |
| 2011/0162062 A1 * | 6/2011 | Kumar et al. .................... 726/15 |
| 2011/0170692 A1 * | 7/2011 | Konrad et al. ................ 380/260 |
| 2011/0231649 A1 * | 9/2011 | Bollay et al. .................. 713/151 |
| 2012/0016977 A1 * | 1/2012 | Robertson et al. ............ 709/224 |
| 2012/0023241 A1 * | 1/2012 | Goel et al. ..................... 709/228 |
| 2012/0174223 A1 * | 7/2012 | Eisen .............................. 726/23 |

OTHER PUBLICATIONS

TLS overhead | netsekure rng, http://netsekure.org/2010/03/tls-overhead, visited Feb. 9, 2012.

* cited by examiner

*Primary Examiner* — Hadi Armouche
*Assistant Examiner* — Hee Song
(74) *Attorney, Agent, or Firm* — McDermott Will & Emery LLP

(57) ABSTRACT

A method, system and computer program product related to an authentication security protocol, which associates a unique Abbreviated Session Identifier (ASI) with some application data packets transmitted, for example, from a client to a server. The present technology can be a modified version of the Transport Layer Security (TLS) protocol. A method of authentication comprises an initial setup comprising negotiating a secure network connection between client and server using TLS, providing a unique ASI by the server, associating the ASI with a TLS protocol session identifier, transmitting the unique ASI and the TLS protocol session identifier to the client, and establishing the secure network connection between the client and server. Subsequent data packets transferred between the client and server may include the unique ASI.

18 Claims, 6 Drawing Sheets

TLS ABBREVIATED SESSION IDENTIFIER PROTOCOL

FIELD OF THE TECHNOLOGY

The present invention pertains to the field of security protocols and in particular to the Transport Layer Security (TLS) protocol.

BACKGROUND

Packet-based data communication protocols are used extensively for both automated and non-automated communication across various types of wired and wireless data networks. It is often desirable to provide a certain level of security for such communication, for example to protect sensitive data and/or to authenticate the origin of the data. Moreover, it is also desirable to reduce certain communication overheads.

The protocols most used on the Internet today include the Transmission Control Protocol (TCP) and the User Datagram Protocol (UDP) which, while a number of alternatives exist, are widely carried via the Internet Protocol (IP). TCP provides a number of functions not provided by UDP. For example, TCP can be used to ensure that data packets are submitted by a source node at a rate supported by the network and destination node, data packets can be transmitted to a destination node and reassembled in an intended sequence, and that data packets lost can be detected and corrected. UDP does not provide the sequencing or flow control of TCP. UDP is often used when loss of a limited number of data packets does not corrupt the function of the communication. For example, UDP has been used for data packets carrying voice or video data.

Standardized security protocols (e.g. TLS (Transport Layer Security), SSL (Secure Socket Layer), and IPSec (Internet Protocol Security)) are typically inefficient when used for Machine-to-Machine (M2M) traffic. Standardized security protocols have a high perceived credibility due to their wide and long successful adoption. However, based on the nature of a given communication, they could prove to be slow and cumbersome.

Some typical M2M traffic can be modeled by small mobile originated (MO) burst of packets with long (>5 minutes) pauses between bursts. Most wireless M2M traffic goes through a NAT (Network Address Translator) device, which could be governed by a mobile network operator. NAT is typically used to connect network nodes that have private IP addresses to a network using public IP addresses. Private and public IP addresses are defined in the Internet Engineering Task Force (IETF) document, RFC 1918. NAT is described in a number of documents, for example, in IETF documents, RFC 2663 and RFC 3022. Due to M2M traffic patterns (long pauses between bursts), for every mobile originated transaction, the server will see a different source (SRC) Port number and SRC IP address because the NAT device has typically timed out on the address and port bindings. It is not possible to know for sure when the NAT releases its port and address bindings.

Servers implementing TLS, for example, use the SRC IP address and SRC Port numbers of incoming packets as a unique binding to the security parameters (secret key and other state information). When the NAT changes the SRC Port or IP address, (for example due to timeout and re-establishment of a NAT binding) the server can no longer look-up the security parameter for that session. TLS has a resume mechanism that can be used when this occurs, to look up the session keys, but the resume mechanism requires about 332 bytes of data and over three messages resulting in longer round trip time. Thereby, making the resume mechanism complicated, non-deterministic, and inefficient for traffic involving long pauses between bursts.

U.S. Pat. Nos. 7,917,758, 7,529,933 and 7,587,598 describe aspects of authentication and re-authentication/resuming of TLS sessions. However, the overhead involved in such resume sessions is high enough for it to pose problems for M2M traffic with long pauses between bursts.

Therefore there is a need for a security authentication protocol that over comes one or more of the problems in the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a TLS Abbreviated Session Identifier Protocol. In accordance with an aspect of the present invention, there is provided a method of authentication between a client and a server, the method comprising: a.) negotiating a secure network connection between the client and the server using Transport Layer Security (TLS) protocol; b.) providing a unique Abbreviated Session Identifier (ASI) by the server along with a TLS protocol session identifier; c.) associating the unique ASI with the TLS protocol session identifier; and d.) transmitting the unique ASI along with the TLS protocol session identifier to the client, wherein subsequent data packets transferred between the client and the server may include the unique ASI. Optionally, the method comprises establishing the secure network connection between the client and the server, for example using a TLS ASI protocol as described herein.

In accordance with another aspect of the present invention, there is provided a system for authenticating connection between a client and a server, the system comprising: a.) a client configured to send and/or receive data; b.) a server configured to send and/or receive data; c.) the system configured to negotiate a secure network connection between the client and the server using Transport Layer Security (TLS) protocol; d.) the server configured to provide a unique Abbreviated Session Identifier (ASI) along with a TLS protocol session identifier; e.) the server configured to associate the unique ASI with the TLS protocol session identifier; and f.) the server configured to transmit the unique ASI with the TLS protocol session identifier, wherein at least some subsequent data packets transferred between the client and the server may include the unique ASI. Optionally, the system is configured to establish the secure network connection between the client and the server, for example using a TLS ASI protocol.

In accordance with another aspect of the present invention, there is provided a computer program product comprising a non-transitory computer readable memory storing computer executable instructions thereon that when executed by a computer perform the following steps of authentication between a client and a server: a.) negotiate a secure network connection between the client and the server using Transport Layer Security (TLS) protocol; b.) provide a unique Abbreviated Session Identifier (ASI) by the server along with a TLS protocol session identifier; c.) associate the unique ASI with the TLS protocol session identifier; and d.) transmit the unique ASI along with the TLS protocol session identifier to the client, wherein at least some subsequent data packets transferred between the client and the server include the unique ASI.

Optionally, the steps include establishing the secure network connection between the client and the server, for example using a TLS ASI protocol.

DETAILED DESCRIPTION

Definitions

Figure 1:
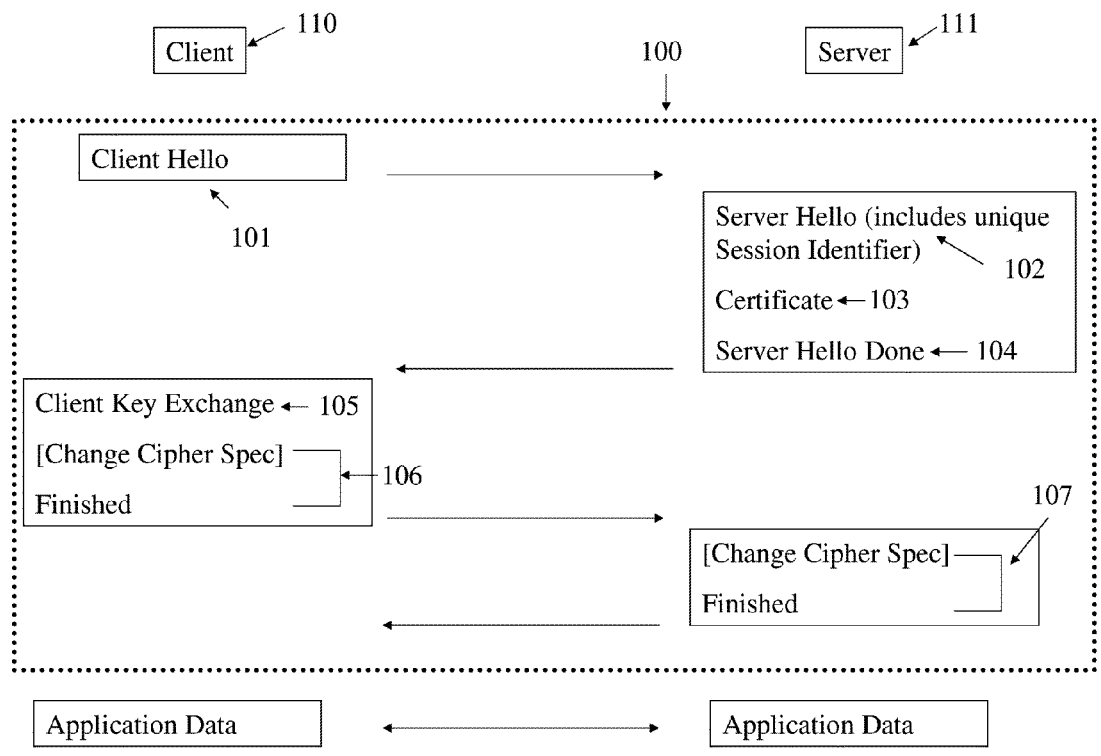
FIG. 1 illustrates a block diagram of the initial TLS handshake using the TLS protocol according to the prior art.

The term "network" is used to refer to an operative interconnection of data processing machines or devices including, but not limited to, personal computers, server computers, hand-held or laptop devices, Network Address Translator (NAT) devices, multiprocessor systems, microprocessor-based systems, set top boxes, programmable consumer electronics, network PCs, minicomputers, mainframe computers, distributed computing environments, routers, super-computers, mobile devices such as personal digital assistants (PDAs), mobile phones, smart phones, or digital cameras, or other digital devices or a combination thereof by means of one or more network connection media. Network connection media may include wired or wireless interconnections. Two or more networks may be interconnected, hierarchically or otherwise organized and collectively referred to as one network. Furthermore, different networks can have different network topologies.

The term "client" is used to refer to an application, device/machine, terminal or automatically or user-operable system that can access a remote service on a server via a network.

The term "server" is used to refer to a system of one or more computers/devices/machines dedicated to providing one or more services over a network. A server can provide services in response to one or more concurrent requests via a network. The services can be provided by one or more computer programs.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present technology provides an authentication security protocol, which associates a unique Abbreviated Session Identifier (ASI) with every application data packet transmitted, for example, from a client to a server. Embodiments of the present technology may be implemented as a modified version of the Transport Layer Security (TLS) protocol. At least some usage of the built-in TLS resume mechanism may be avoided by use of the ASI. This may in turn reduce communication overhead associated with the built-in TLS resume mechanism. Efficiency, simplicity and predictability may also be provided for.

TLS Protocol

The Transport Layer Security (TLS) protocol may be used to establish a secure method of communication between two devices on a network. Secure communication may be required where intermediate devices cannot be trusted, such as wireless networks, or foreign network access points. Furthermore, upon disconnection such as one endpoint changing the access point through which it is connected to the other endpoint, the caching of session keys and other relevant information can enable two securely communicating endpoints to resume their communication.

TLS is an example of an authentication security protocol that provides an authentication mechanism, as well as support for negotiating an encryption mechanism and providing encryption key exchange. Once a secure connection is established, using a protocol such as TLS, the resulting communication is said to take place within a secure channel because any number of intermediate network devices can come in contact with the data stream, but only the two endpoints will have the necessary keys to decrypt the data. A worker skilled in the art would readily understand how to establish a TLS session, for example in accordance with known or future versions of the TLS protocol.

A mobile device or M2M device can be authenticated by a server through a wireless access point via the TLS protocol. A worker skilled in the art would readily appreciate such an authentication. When the mobile device is handed off to a second wireless access point, the mobile device's initial connection to the network would typically have been terminated and the wireless access point will pass the device along to the authentication server. Rather than performing all of the steps required to establish a TLS session from scratch, the device's computing device resumes connection by using the Session Identifier of the previously negotiated session. A worker skilled in the art would readily understand such a resuming TLS connection, for example in accordance with known or future versions of the TLS protocol.

A worker skilled in the art would appreciate that current versions of the TLS Handshake Protocol generally involve the following steps:

1.) Exchange hello messages to agree on algorithms, exchange random values, and check for session resumption.
2.) Exchange the necessary cryptographic parameters to allow the client and server to agree on a premaster secret.
3.) Exchange certificates and cryptographic information to allow the client and server to authenticate themselves.
4.) Generate a master secret from the premaster secret and exchanged random values.
5.) Provide security parameters to the record layer.
6.) Allow the client and server to verify that their peer has calculated the same security parameters and that the handshake occurred without tampering by an attacker.

FIG. 1 shows the block diagram for establishing an initial (new) TLS handshake/session 100 between a client 110 and a server 111. Following which, the exchange of Application Data between the client and the server takes place. To establish the initial TLS handshake the client sends a Client Hello message 101 to make the initial contact with the server. The average size of the Client Hello message may be about 160 to 170 bytes. The server in turn sends a Server Hello message 102, which also includes a unique Session Identifier exclusive to the client. The unique Session Identifier is used during resuming TLS handshakes. The average size of the Server Hello message may be about 70 to 75 bytes. The server also sends its certificate 103 and Server Hello Done 104 messages. The average size associated with the certificate varies quite a bit between different servers. An average size of about 6000 bytes may be allotted to the certificate plus the Server Hello Done messages combined. Following the certificate transfer, the client sends a Client Key Exchange message 105. The Client Key Exchange message corresponds to an average size of about 130 bytes. Following which, the client sends Change Cipher Spec along with a Finished message 106. The Change Cipher Spec has a fixed size of 1 byte and the Finished message, depending on whether SSLv3 is used or TLS is used, has a size of about 36 or 12 bytes, respectively. The server subsequently sends Change Cipher Spec along with a Finished message 107. Once again, the Change Cipher Spec has a fixed size of 1 byte and the Finished message, depending on whether SSLv3 is used or TLS is used, has a size of about 36 or 12 bytes, respectively.

Each message exchanged has a TLS handshake header of about 4 bytes associated with it. A total of 7 messages are exchanged when establishing the initial TLS handshake. One also has to keep in mind that messages exchanged have a TLS record header of about 5 bytes per record. A common case can be conceptualized in that each arrow in FIG. 1 corresponds to a record, so that there are 4 records in total. Thus, the total overhead to establish an initial TLS handshake comes to about 6.5K bytes on average (4 TLS Record Headers×5 Bytes/Header+7 TLS Handshake Headers×4 Bytes/Header+ 170 Bytes for Client Hello+75 Bytes for Server Hello+6000 Bytes for Certificate and Server Hello Done+130 Bytes for Client Key Exchange+2 Change Cypher Spec Messages×1 Byte/Message+2 Finished Messages×12 Bytes/Message=6449 Bytes). A worker skilled in the art would readily understand the overhead involved in establishing an initial TLS handshake/session.

Figure 2:
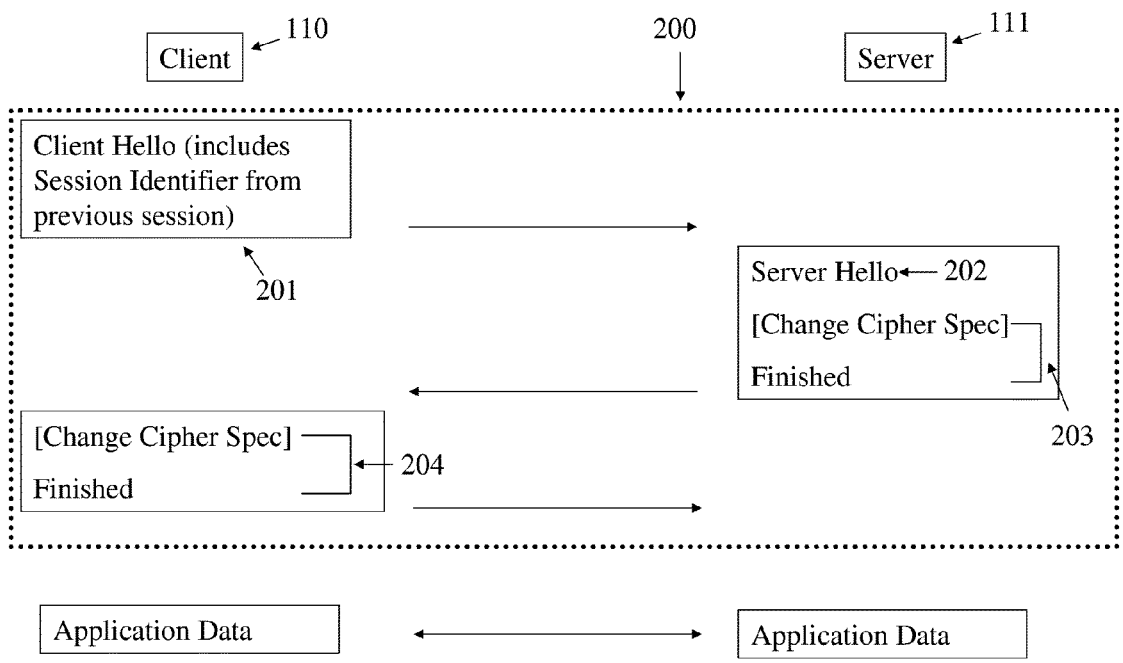
FIG. 2 illustrates a block diagram of the resuming TLS handshake using the TLS protocol according to the prior art.

FIG. 2 shows the block diagram for a resuming TLS handshake 200 between a client 110 and a server 111 for which an initial TLS handshake was previously established. Following the resuming TLS handshake, the exchange of Application Data between the client and the server takes place. To establish the resuming TLS handshake the client sends a Client Hello message 201 to make the initial contact with the server. The average size of the Client Hello message is about 160 to 170 bytes plus an extra 32 bytes for the unique Session Identifier exclusive to the client. The server in turn sends a Server Hello message 202. The average size of the Server Hello message is about 70 to 75 bytes. Following this, the client and the server exchange Change Cipher Spec and Finished messages 203 and 204. The Change Cipher Spec has a fixed size of 1 byte and the Finished message, depending on whether SSLv3 is used or TLS is used, has a size of about 36 or 12 bytes, respectively.

As explained above, each message exchanged has a TLS handshake header of about 4 bytes associated with it. A total of 4 messages are exchanged when establishing the resuming TLS handshake. Once again, the messages exchanged have TLS record header of about 5 bytes per record. Each arrow in FIG. 2 may correspond to a record, so 3 records in total. The main difference between the initial TLS handshake and resuming TLS handshake is that the overhead involved in the transfer of certificates and client key are no longer present in the resuming TLS handshake; thus, reducing the overhead of the resuming TLS handshake by approximately 6000 bytes. The total overhead to establish a resuming TLS handshake comes to about 334 bytes on average (3 TLS Record Headers×5 Bytes/Record+4 TLS Handshake Headers×4 Bytes/Header+(170+32) Bytes for Client Hello Message)+75 Bytes for Server Hello Message+2 Change Cypher Spec Messages×1 Byte/Message+2 Finished Messages×12 Bytes/Message=334 Bytes). A worker skilled in the art would readily understand the overhead involved in establishing a resuming TLS handshake/session.

The overhead, on average, for an application data packet, which may include content type, version, length, Message Authentication Code (MAC), and padding, may be about 32 bytes. A worker skilled in the art would readily appreciate the average overhead associated with an application data packet. If a client, for example, sends an application data packet every 30 minutes, and further if this requires a reconnection/TLS Resume (for example due to a NAT binding timeout prior to the 30 minutes), then each time (every 30 minutes) the client wants to transmit an application data, it seeks a TLS resume handshake. In this case, the TLS Protocol also adds 32 bytes of overhead for every 30 minute transmission, which brings the total overhead for resuming connection to about 366 bytes. In some cases, this may be significantly larger than the amount of application data to be sent.

In the initial TLS connection and in the resuming TLS connection, the application data is exchanged within the TLS channel established between the client and the server; the application data exchanged between the client and the server is encrypted. A worker skilled in the art would readily appreciate the information presented in FIGS. 1 and 2 and the overhead involved in establishing a new TLS handshake and a resuming TLS handshake.

It is to be understood that the TLS Protocol includes any modifications made to the current TLS Protocol Standards. TLS Abbreviated Session Identifier (ASI) Protocol—Initial TLS ASI According to embodiments, the TLS ASI protocol can be seen as a modified version of the TLS protocol, wherein an ASI is included in transmitted packets in one of the manners described herein. The TLS ASI protocol has potentially less overhead for application data packet exchange, when TLS resume actions would typically be required. Conceptually, embodiments of the present technology may be regarded as replacing the overhead of the TLS resume mechanism, which is intermittent, with a smaller overhead which may be added to every packet, or at least to critical packets. In some embodiments, the client may utilize (e.g. via channelling) the TLS ASI protocol only for packets where the IP/port binding is deemed likely to be lost by the server. For example, prediction or estimation of the likelihood of IP/port binding loss may be based on an analysis of NAT timeout lengths, detection of failure to communicate with the server, or analysis of other network conditions as would be readily understood by a worker skilled in the art. If the TLS resume mechanism of the existing TLS protocol were to be used with at least a given frequency, then the replacement mechanism of the TLS ASI protocol would result in lower overhead. It has been identified that this is indeed the case with certain types of traffic, such as low-volume and/or intermittent machine-to-machine traffic in mobile networks. A reason for this is that NAT timeouts in such mobile networks may be substantially as frequent or more frequent than mobile-originated machine-to-machine messages transmitted in a TLS session.

Figure 3:
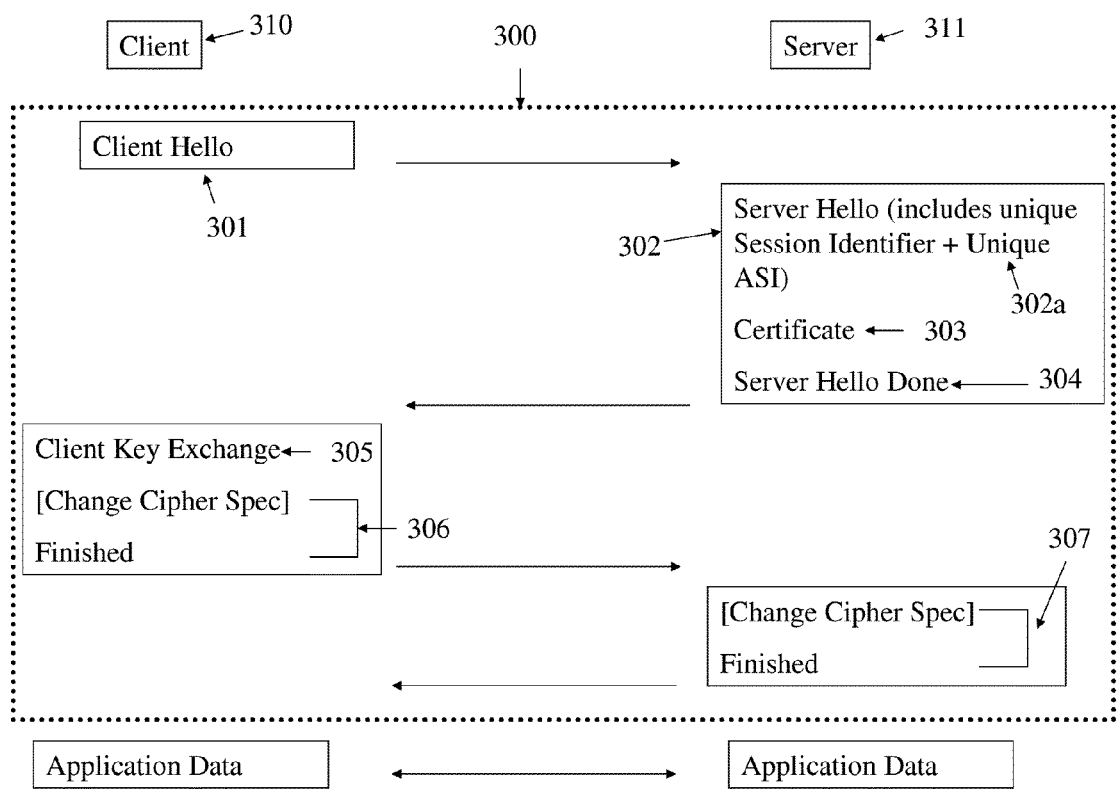
FIG. 3 illustrates a block diagram of the initial TLS ASI handshake using the TLS ASI protocol according to embodiments of the present technology.

In embodiments, as illustrated in FIG. 3, a client 310 and a server 311 establish an initial TLS ASI handshake 300. The client sends a Client Hello message 301 to make the initial contact with the server. The server then sends a Server Hello message 302 plus a unique Abbreviated Session Identifier (ASI) 302*a*, which will be explained in detail later. The server then sends its certificate 303 and Server Hello Done 304 messages. Subsequently, the client sends a Client Key Exchange 305. Following which, the client sends Change Cipher Spec along with a Finished message 306. The server in turn sends Change Cipher Spec along with a Finished message 307. According to embodiments, the TLS ASI handshake may involve a total exchange of seven messages.

The initial TLS ASI handshake is similar but not identical to the standard initial TLS handshake with the addition of the ASI. The exchange of messages between the client and the server would be readily appreciated by a worker skilled in the art. The overheads involved in establishing the initial TLS ASI handshake and the standard initial TLS handshake are different only in that there is an addition of the ASI, which may be a small number of bytes in relative terms. The TLS ASI Handshake may involve, for example, an average total overhead of about 6453 bytes (6449 bytes as in initial TLS handshake+4 bytes for the ASI). The unique ASI involved during the establishment of the initial TLS ASI handshake may be created and assigned by the server upon the client initiating a need to communicate with the server. Upon the unique ASI being assigned to the client, all communication between the client and server may be channelled using this ASI. The channelling between a client and server involving such a unique ASI may be regarded as the TLS ASI protocol.

According to embodiments, a difference between the initial TLS ASI handshake and the standard initial TLS handshake is that, on top of the overhead associated in the standard initial TLS handshake, there are an additional number of bytes that relate to the ASI in the overhead associated in the initial TLS ASI handshake. This ASI addition may be made to the Session Identifier that would be created by the server in a standard TLS handshake. A worker skilled in the art would readily understand the Session Identifier created in a standard initial TLS handshake. The overhead associated with an ASI will be explained in detail later.

In embodiments, after the initial TLS ASI handshake has been established, there is a secure channel established between the client and the server. This channel may be used for exchange of application data between the client and the server and the application data exchanged between the client and the server can be encrypted. In some embodiments, application data exchanged between the client and the server may be encrypted and may have the ASI appended to them. In some embodiments, application data exchanged between the client and the server may not be encrypted and may have only the ASI appended to them.

TLS Abbreviated Session Identifier (ASI) Protocol—Resuming TLS ASI

As explained above, during the initial TLS ASI handshake between a client and a server, a substantially unique ASI can be assigned to the client by the server. From this juncture, an exchange of information between the client and server can be authenticated with the aid of this unique ASI. Upon disconnection of a previous session or due to long pauses between client contact attempts with the server, the server can use the sent ASI to uniquely identify stored security information used to complete authentication and exchange information from thereon. This may be regarded as an operation of the Resuming TLS ASI mechanism of the TLS ASI Protocol.

Figure 4:
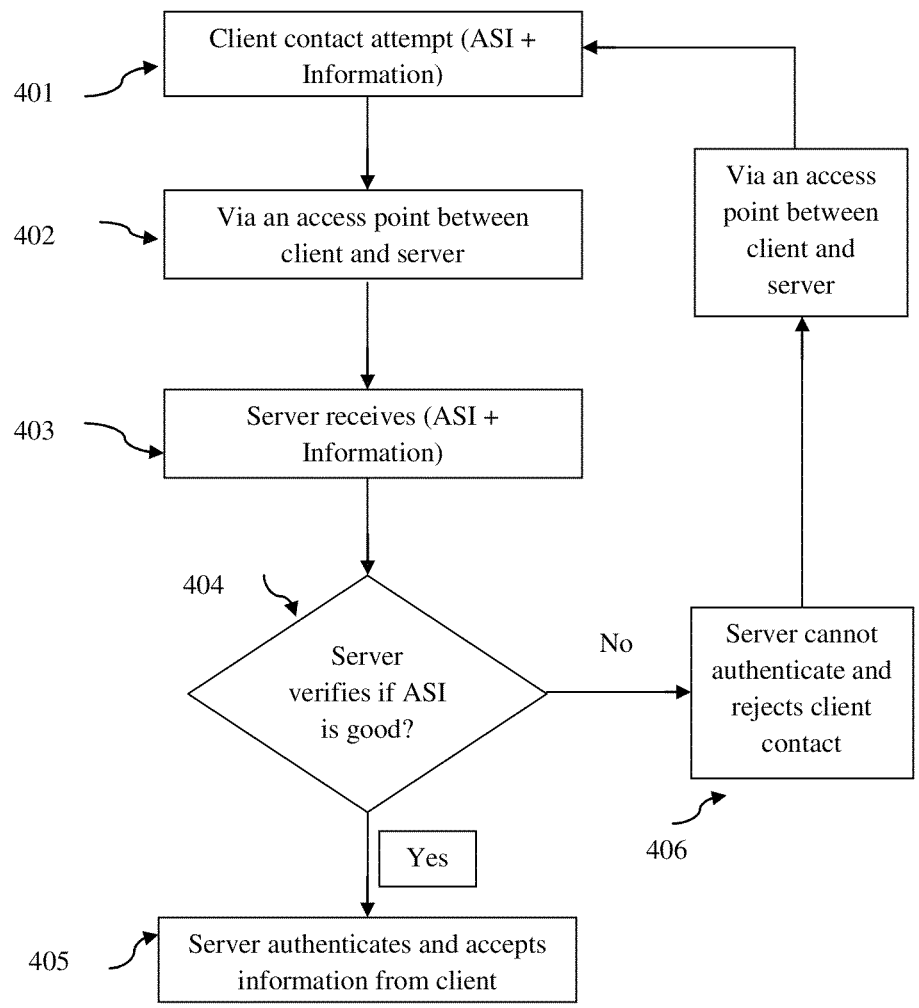
FIG. 4 illustrates a flowchart of the resuming TLS ASI mechanism using the TLS ASI protocol according to embodiments of the present technology.

In embodiments, as illustrated in FIG. 4, the client attempts to contact the server, which previously assigned it a unique ASI. In attempting to contact the server, the client appends information with the ASI 401 and transmits it via an access point 402 to the server. The server receives the ASI and the information 403. The server then verifies the ASI 404. If the ASI is valid, the server can authenticate and accept the information from the client 405. If the ASI is not valid, the server cannot authenticate and rejects the client's contact attempt 406 via an access point between the client and the server. In embodiments, the server may verify the validity of the ASI by performing a database lookup operation to determine if the ASI is currently assigned by itself to the particular client. In embodiments, the ASI may be assigned to a particular client only for a predetermined amount of time. After which, its validity no longer holds. A worker skilled in the art would readily understand mechanisms to establish a predetermined validity time for the ASI. For example, a lifetime countdown timer may be associated with an ASI, and the ASI may be deemed expired once the countdown timer reaches zero. In embodiments, information exchanged between the client and server may be one or more application data packets. In some embodiments, the information exchanged between the client and server may be encrypted. In some embodiments, the information exchanged between the client and server may not be encrypted. In embodiments, the communication between the client and the server may be direct, substantially without intermediate access points.

Abbreviated Session Identifier (ASI)

The ASI can be generated, selected or determined in one or more of a variety of manners. In embodiments, the ASI may be a randomly or pseudo-randomly generated value. In embodiments, the ASI may be obtained from a database of ASI values. In embodiments, the ASI may correspond to a port number, an IP address or a value based thereon, or other value that could be reasonably used as a substantially unique value. The ASI transmission may be bi-directional, i.e., may flow from the client to the server or from the server to the client.

Figure 5:
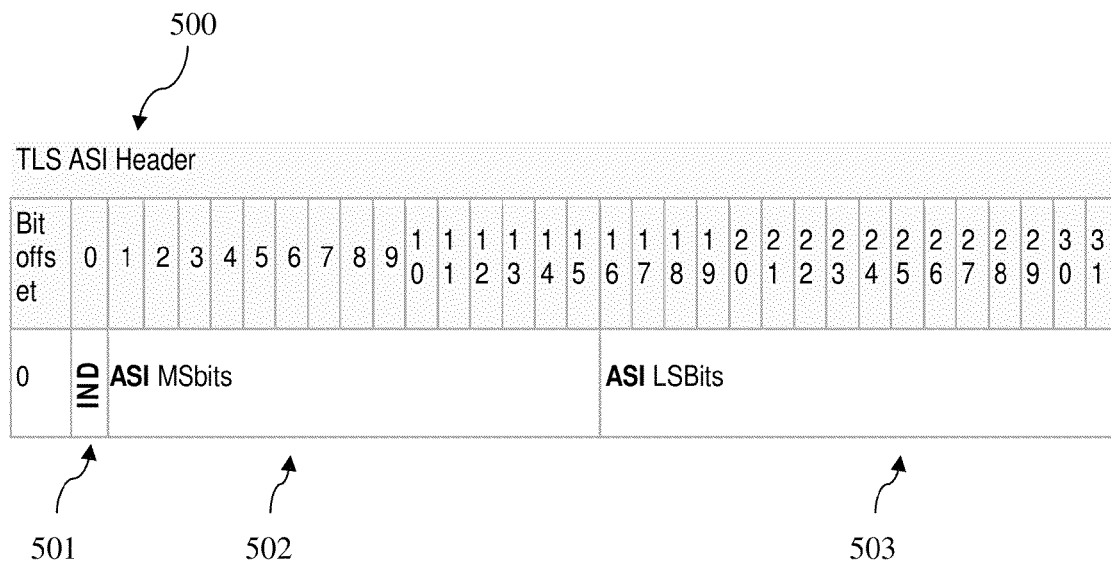
FIG. 5 illustrates the TLS ASI header and the overhead associated with it according to embodiments of the present technology.

FIG. 5 refers to a TLS ASI Header in accordance with embodiments of the present technology. The TLS ASI Header may be of various fixed or variable sizes. In embodiments, the TLS ASI Header is 0 bytes, 1 byte, 2 bytes, or 4 bytes or the like. In some embodiments, wherein the TLS ASI Header is 0 bytes, existing Destination IP address and/or Destination Port Number fields of the application data packet header may be used as a substitute for an explicit ASI header, as described herein. That is, the ASI may be implied from one or more existing fields of a packet header or payload. The existing packet header fields may also be used for another purpose, such as to facilitate IP, TCP or UDP communication, rather than in a separate, dedicated field.

In embodiments, as illustrated in FIG. 5, the TLS ASI Header 500 has an overhead of 4 bytes per application data packet. The 4 bytes of overhead for an assigned ASI may be regarded as 2 bytes less 1 bit for the Most Significant bits (MSbits) 502, and 2 bytes for the Least Significant bits (LSbits) 503. The field IND 501 takes up 1 bit of space in the header and may be set to 1 to denote that an application data packet is encapsulated with the ASI and may be set to 0 to denote that an application data packet is not encapsulated with the ASI. In embodiments, the field IND may be set to 1 to denote that the application data packet is not encapsulated with the ASI and may be set to 0 to denote that the application data is encapsulated with the ASI.

As an example, for a TLS ASI Header of 31 bits, the number of unique Abbreviated Session Identifiers that may be created may amount to approximately 2 Billion ($2^{31}$), which can be considered substantial for a single server. To illustrate an example of the overhead involved for a client that may send an application data packet every 30 minutes, the TLS ASI overhead may be the addition of the overhead of the application data packet and the overhead of the TLS ASI Header;

thus, the total overhead may amount to 36 bytes (32+4) as opposed to the standard TLS resuming overhead, which is 366 bytes (32+334).

According to embodiments, an Abbreviated Session Identifier is used to identify a particular client so that all communication between that client and the server may be secure. As a result, the ASI should typically be a constant value for that session. In embodiments, the server may re-assign the client, at any time, a new ASI, which may then be used for subsequent communications between the server and the client. A NAT device normally changes the SRC Port and SRC IP address of a client when routing information from the client to the destination server. A worker skilled in the art would readily understand the workings of a NAT device. As the NAT device changes the SRC port number and SRC IP address, they may not be used as an ASI. However, the destination (DST) Port number and DST IP address of the server that the client is trying to contact, may be unchanged by the NAT device during routing. Therefore, the DST Port number or DST IP address may be used as an ASI. In embodiments, both the DST Port number and DST IP address may be used as an ASI. In embodiments, only one of them, either the DST Port number or the DST IP address, may be used as an ASI. Therefore, the DST Port number and DST IP address may be used for two purposes: normal TCP/IP usage and as an ASI.

Generally, for ease of server implementation and routing, TLS packets are sent only to the DST Port, 443, in the server. If an IP address was dedicated to a server, which is dedicated to handling only TLS traffic then substantially any port could be used. In embodiments, if a server is dedicated to handle only TLS ASI traffic then the server may assign, upon receiving a connection request from a client, a new DST Port number for all communications from that client and communicate to the client the assignment of the new DST Port number. The initial connection request may be sent to the DST Port, 443. The new DST Port number may be thought of as the unique ASI for the client. The DST Port number in a server, is usually a 16 bit value, which yields approximately 65K (2^16) unique values; these unique values may be used as unique Abbreviated Session Identifiers, which may be assigned to various clients that may want to communicate with the server.

If we assume a server with only one IP address then this would call for the server to be disposed with only 65K unique Abbreviated Session Identifiers, associated with DST Port numbers, to be used for TLS ASI sessions with 65K clients. In embodiments, the ASI may also be a DST IP address. A server may be assigned many IP addresses depending on the availability of IP addresses. In an IPv4 address space, due to the ever increasing amount of Internet usage, there are limited IP addresses available. If a server is to be provided with a few IP addresses, instead of one, then these IP addresses, which are unique in themselves, may also be used as unique Abbreviated Session Identifiers in addition to the 65K unique Abbreviated Session Identifiers associated with the DST Port numbers.

If the server and client both support IPv6 address space, the server may be assigned a considerable number of IP addresses. In this case, there may not even be a necessity to change the DST Port number. An IPv6 address space is likely to have (2^64) unique IPv6 addresses, which constitute a substantial number of unique values, which may be used as unique Abbreviated Session Identifiers.

An ASI contained in a DST Port number field may be up to 2 bytes long. An ASI contained in an IPv4 IP address field may also be up to 2 bytes long. An ASI contained in an IPv6 address field may be up to 4 bytes long. An ASI contained across both a DST Port number field and an IPv4 IP address field may be up to 4 bytes long. An ASI contained across both a DST port number field and an IPv6 IP address field may be up to 6 bytes long. In embodiments, application data packet exchange between a client and a server may utilize an ASI that is a DST Port number from a server that has only one IP address assigned to it from the IPv4 address space. In embodiments, application data packet exchange between a client and a server may utilize an ASI that is a DST IP address that may belong to the IPv6 address space. In embodiments, there may not be a need to encapsulate the application data packet with a TLS ASI Header. In such embodiments, the total overhead associated with application data exchange between a given client and server may be just the 32 bytes associated with the application data packet itself.

In embodiments using the IPv4 address space, it is anticipated that there may be a need to encapsulate the TLS ASI Header to increase the number of unique Abbreviated Session Identifiers that may be used for communication between a given server and many different clients. In such embodiments, the TLS ASI Header may be regarded to be similar to the one shown in FIG. 6. In embodiments, both an IP address field and a DST Port number field may be used to convey an ASI, while also functioning for TCP/IP purposes.

Figure 6:
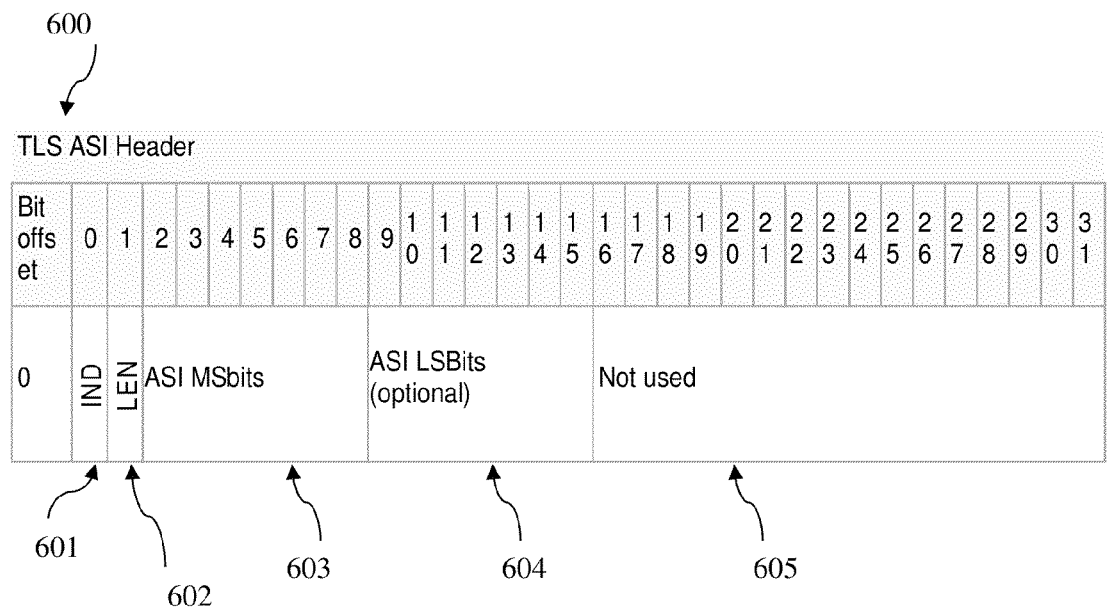
FIG. 6 illustrates the TLS ASI header and the overhead associated with it according to embodiments of the present technology.

Referring to FIG. 6, the TLS ASI Header constitutes various fields in accordance with embodiments of the present technology. The field IND 601 takes up 1 bit of space in the header and may be set to 1 to denote that the application data packet is encapsulated with the TLS ASI Header and may be set to 0 to denote that the application data packet is not encapsulated with the TLS ASI Header. In embodiments, the field IND may be set to 1 to denote that the application data packet is not encapsulated with the TLS ASI Header and may be set to 0 to denote that the application data is encapsulated with the TLS ASI Header. The field LEN 602 takes up 1 bit of space in the header and may be set to 0 to denote that a 6 bit ASI will follow and may be set to 1 to denote that a 14 bit ASI will follow. If the ASI is 6 bits then the ASI MSbits field 603 may contain it. If the ASI is 14 bits then both ASI MSbits 603 and ASI LSbits 604 fields may contain it. The last 16 bits of the TLS ASI Header 605 are not used. In embodiments, the last 16 bits of the TLS ASI Header 605 may be used.

In embodiments using DST Port for information exchange between a server and a given client and encapsulating the application data packet with the TLS ASI Header, the total number of unique values that may be generated to be used as unique Abbreviated Session Identifiers may be 2^(16+n), where n represents the total number of bits used for the ASI MSbits and ASI LSbits in the TLS ASI Header. For example, if 6 bits are to be used then the total number of unique values per server IP address would be 2^(16+6)=4.2 million unique values, so 4.2 million Abbreviated Session Identifiers may be used by the server to interact with 4.2 million clients. As another example, if 14 bits are to be used then the total number of unique values per server IP address would be 2^(16+14)=1 billion unique values, which at the current time is typically more than the number of clients that a single server can support.

If, for example, a client is sending an application data packet every 30 minutes, the TLS ASI protocol overhead using the TLS ASI Header shown in FIG. 6 may be just 32 bytes+1 byte or 32 bytes+2 bytes as opposed to 366 bytes required for a standard TLS resuming session. As briefly stated before, if the application data packets are not encapsulated with the TLS ASI Header and if they accommodate the ASI within their own overhead then the total overhead using the TLS ASI protocol would be only 32 bytes.

In embodiments where the ASI is communicated from client to server using a DST port number field, a DST IP address field, or both, or the like, the server may be configured to adjust its operation accordingly. Adjusting operation of the server may comprise using a destination IP address indicated in the destination IP address field and a destination port number indicated in the destination port number field for communication with the client, in accordance with an established TCP/IP protocol. For example, the server operation may be adjusted so that the server responds to IP packets sent to the IP address indicated in the DST IP address field, which may require the server to have a block of IP addresses assigned to it. The server operation may be adjusted so that the server responds to TCP packets sent to the port number indicated in the DST port number field.

In some embodiments, the server may be configured to inform the client that all subsequent data packets should be sent to a specific DST IP address and/or DST port number. The client may be so informed via a dedicated message, for example during setup of the TLS ASI protocol. In some embodiments, the client may be informed of the DST IP address and/or DST port number to be used implicitly upon receipt of the unique ASI when the ASI is transmitted to the client. That is, the client, upon receipt of the ASI and knowing how the ASI is to be at least partially included in subsequent data packets via the DST IP address field, DST port number field, or both, reconfigures itself so that the ASI is included in the subsequent data packets in the known manner. Configuring the subsequent data packets to include the ASI then also configures those packets so that they are addressed to the appropriate server IP address and/or server port number.

The invention will now be described with reference to specific examples. It will be understood that the following examples are intended to describe embodiments of the invention and are not intended to limit the invention in any way.

EXAMPLES

Example 1

A client, which is a mobile machine-to-machine device, attempts to contact a server for secure transmission of an application data packet. The client attempts to contact the server, using the initial TLS ASI handshake, in order to establish a secure connection. During the process, the server assigns a unique ASI to the client. The ASI is a randomly generated value, which is selected by the server from a database of random values. Once the initial TLS ASI handshake has been established a secure channel exists between the client and the server and the client transmits the application data packet. However, after transmission, the network connection between the client and the server drops.

The client attempts to contact the server about every 30 minutes to send an application data packet. Once the client has been assigned a unique ASI during the initial TLS ASI handshake, subsequent communication sessions between the client and the server will involve the client being authenticated by the server; for which, the unique ASI associated with that client is relied upon.

When the client wants to transmit an application data packet that is, for example, 100 bytes every 30 minutes, it sends the ASI and transmits a total overhead of 36 bytes (32 TLS header+4 ASI tunnel) to the server. Of the 4 bytes of TLS ASI header overhead, 31 bits belong to the randomly generated ASI, which is unique to the client and 1 bit belongs to the IND field, which can be set to 1 to denote that the application data packet header is encapsulated with the TLS ASI header.

Thus, the total overhead involved in transmitting an application data packet that is 100 bytes every 30 minutes by the client to the server using the TLS ASI protocol is 36 bytes.

Example 2

A client, which is a machine-to-machine device, attempts to contact a server for secure transmission of an application data packet. The client attempts to contact the server, using the initial TLS ASI handshake, in order to establish a secure connection. During the process, the server assigns a unique ASI to the client. The server is dedicated to handle only TLS ASI traffic and is dedicated an IP address. In this case, the server upon being contacted by the client via a NAT device assigns a new DST Port number, which is specific to this client. It is the new DST Port number that will be used as the ASI. Once the initial TLS ASI handshake has been established, a secure channel exists between the client and the server and the client transmits the application data packet. However, after transmission, the network connection between the client and the server drops.

The client attempts to contact the server every 30 minutes or less to send an application data packet. Once the client has been assigned a unique ASI during the initial TLS ASI handshake, subsequent communication sessions between the client and the server will involve the client being authenticated by the server; for which, the unique ASI associated with that client is relied upon.

In the present example, when the client is to transmit an application data packet (for example to support transmission of 100 bytes of data every 30 minutes), the client only has to send the normal TLS overhead e.g. having to transmit only 32 bytes of total overhead to the server. The TLS ASI Header in this case is 0 bytes because the existing Destination IP address and/or Destination Port Number fields of the application data packet header uniquely identify the packet without the need for an explicit ASI.

Example 3

A client, which is a machine-to-machine device, attempts to contact a server for secure transmission of an application data packet. The client attempts to contact the server, using the initial TLS ASI handshake, in order to establish a secure connection. During the process, the server assigns a unique ASI to the client. The server is dedicated to handle only TLS ASI traffic and is dedicated an IP address. In this case, the server upon being contacted by the client, via a NAT device, assigns a 16 bit DST Port number plus a 6 bit value, which together constitute a unique value, which will be used as the ASI. Alternatively, the server assigns a 16 bit DST Port number plus a 14 bit value, which together constitute a unique value, which will be used as the ASI. Once the initial TLS ASI handshake has been established a secure channel exists between the client and the server and the client transmits the application data packet. However, after transmission, the network connection between the client and the server drops.

The client attempts to contact the server every 30 minutes or less to send an application data packet. Once the client has been linked with a unique ASI during the initial TLS ASI handshake, subsequent communication sessions between the client and the server will involve the client being authenticated by the server; for which, the unique ASI associated with the client is relied upon.

When the client wants to transmit an application data packet that is, for example, 100 bytes every 30 minutes, it sends the ASI header and transmits a total overhead of 34 bytes (32 TLS header+2 TLS ASI tunnel) to the server. Of the 2 bytes of the TLS ASI header overhead, 1 bit belongs to the IND field, which can be set to 1 to denote that the application data packet header is encapsulated with the TLS ASI header; 1 bit belongs to the LEN field, which can be set to 0 to denote that a 6 bit value will be added to the DST Port number and can be set to 1 to denote that a 14 bit value will be added to the DST Port number. Thus, the total overhead involved in transmitting an application data packet that is 100 bytes every 30 minutes by the client to the server using the TLS ASI protocol is 34 bytes.

Example 4

A client, which is a machine-to-machine device, attempts to contact a server for secure transmission of an application data packet. The client attempts to contact the server, using the initial TLS ASI handshake, in order to establish a secure connection. During the process, the server assigns a unique ASI to the client. The server and client both support IPv6. As a result, the server is disposed with a very large IPv6 address space available, for example/64 bit prefix, which yields a plethora of (2^64) IPv6 addresses. Thus, of the many unique IPv6 addresses that may be assigned to the server, one of them will be selected and assigned, as the ASI, by the server to that specific client. Once the initial TLS ASI handshake has been established, the client continues communication but switches to use the newly assigned IPv6 as the destination IP address and a secure channel exists between the client and the server and the client transmits the application data packet. However, after transmission, the network connection between the client and the server drops. For example, a dropped connection may be due to change in access point and/or access technology via which the client connects to the server.

The client attempts to contact the server every 30 minutes or less to send an application data packet. Once the client has been linked with a unique ASI during the initial TLS ASI handshake, subsequent communication sessions between the client and the server will involve the client being authenticated by the server; for which, the unique ASI associated with the client is relied upon.

When the client wants to transmit an application data packet that is, for example, 100 bytes every 30 minutes, it implies the ASI from the port number or other available information, thereby having to transmit only 32 bytes of total overhead to the server. The TLS ASI Header in this case is 0 bytes.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method of authentication between a client and a server, the method comprising:
   negotiating a secure network connection between the client and the server using Transport Layer Security (TLS) protocol;
   providing a unique Abbreviated Session Identifier (ASI) by the server along with a TLS protocol session identifier;
   associating the unique ASI with the TLS protocol session identifier; and
   transmitting the unique ASI along with the TLS protocol session identifier to the client,
   wherein subsequent data packets transferred between the client and the server include the unique ASI,
   wherein the subsequent data packets comprise packets other than TLS handshake packets,
   wherein the subsequent data packets correspond to application data packets comprising application-level data for exchange between the client and the server, and
   wherein including the unique ASI in the subsequent data packets comprises causing a pre-existing field of each of the subsequent data packets to hold a data value, the data value being at least a portion of the unique ASI, the data value, as conveyed via the pre-existing field of each of the subsequent data packets, also used for another purpose during processing of each of the subsequent data packets.

2. The method of claim 1, further comprising re-establishing the secure network connection following disconnection, wherein re-establishing the secure network connection comprises:
   transmitting the unique ASI in at least one of said subsequent data packets, and using the unique ASI to re-establish the secure network connection.

3. The method of claim 1, wherein the subsequent data packets are encapsulated with a TLS ASI header indicative of the unique ASI.

4. The method of claim 3, wherein the TLS ASI Header adds an overhead of 0 bytes, 1 byte, 2 bytes or 4 bytes to each of the subsequent data packets.

5. The method of claim 1, wherein the subsequent data packets comprise client-originating application data packets, and wherein the pre-existing field of the client-originating application data packets comprises a destination IP address field, a destination port number field, or both, the method further comprising:
adjusting operation of the server to use a destination IP address indicated in the destination IP address field and a destination port number indicated in the destination port number field for communication with the client, in accordance with an established TCP/IP protocol,
wherein the destination IP address, the destination port number, or both, are selected from respective pluralities of values which are usable by the server in operation thereof.

6. The method of claim 1, wherein the unique ASI is a random arbitrarily chosen or generated value, a port number, or an Internet Protocol (IP) address.

7. The method of claim 6, wherein the IP address belongs to IPv4 or IPv6.

8. The method of claim 1, wherein one or both of a destination port number and a destination IP address of each of the subsequent data packets is concurrently used as the ASI, wherein the destination IP address, the destination port number, or both, are selected from respective pluralities of values which are usable by the server in operation thereof.

9. The method according to claim 1, wherein the unique ASI is shorter in length than the TLS protocol session identifier.

10. A system for authenticating connection between a client and a server, the system comprising:
a client configured to send and/or receive data;
a server configured to send and/or receive data;
the system configured to negotiate a secure network connection between the client and the server using Transport Layer Security (TLS) protocol;
the server configured to provide a unique Abbreviated Session Identifier (ASI) along with a TLS protocol session identifier;
the server configured to associate the unique ASI with the TLS protocol session identifier; and
the server configured to transmit the unique ASI with the TLS protocol session identifier;
wherein at least some subsequent data packets transferred between the client and the server include the unique ASI,
wherein the subsequent data packets comprise packets other than TLS handshake packets,
wherein the subsequent data packets correspond to application data packets comprising application-level data for exchange between the client and the server, and
wherein including the unique ASI in the subsequent data packets comprises causing a pre-existing field of each of the subsequent data packets to hold a data value, the data value being at least a portion of the unique ASI, the data value, as conveyed via the pre-existing field of each of the subsequent data packets, also used for another purpose during processing of each of the subsequent data packets.

11. The system of claim 10, wherein the subsequent data packets comprise application data packets.

12. The system of claim 10, further configured to re-establish the secure network connection following disconnection, wherein re-establishing the secure network connection comprises:
transmitting a data packet including the unique ASI, and using the unique ASI received in the data packet to re-establish the secure network connection.

13. The system of claim 10, wherein the data packets are encapsulated with a TLS ASI header indicative of the unique ASI.

14. The system of claim 13, wherein the TLS ASI Header adds an overhead of 0 bytes, 1 byte, 2 bytes or 4 bytes to each of the subsequent data packets.

15. The system of claim 10, wherein the subsequent data packets comprise client-originating application data packets, and wherein the pre-existing field of the client-originating application data packets comprises a destination IP address field, a destination port number field, or both, the server further configured to:
adjust operation to use a destination IP address indicated in the destination IP address field and a destination port number indicated in the destination port number field for communication with the client, in accordance with an established TCP/IP protocol,
wherein the destination IP address, the destination port number, or both, are selected from respective pluralities of values which are usable by the server in operation thereof.

16. The system of claim 10, wherein the unique ASI is a random arbitrarily chosen/generated value, a port number, or an Internet Protocol (IP) address.

17. The system of claim 16, wherein the IP address belongs to IPv4 or IPv6.

18. A computer program product comprising a non-transitory computer readable memory storing computer executable instructions thereon that when executed by a computer perform the following steps of authentication between a client and a server:
negotiate a secure network connection between the client and the server using Transport Layer Security (TLS) protocol;
provide a unique Abbreviated Session Identifier (ASI) by the server along with a TLS protocol session identifier;
associate the unique ASI with the TLS protocol session identifier;
transmit the unique ASI along with the TLS protocol session identifier to the client; and
wherein at least some subsequent data packets transferred between the client and the server include the unique ASI,
wherein the subsequent data packets comprise packets other than TLS handshake packets, and
wherein the subsequent data packets corresponding to application data packets comprising application-level data for exchange between the client and the server,
wherein including the unique ASI in the subsequent data packets comprises causing a pre-existing field of each of the subsequent data packets to hold a data value, the data value being at least a portion of the unique ASI, the data value, as conveyed via the pre-existing field of each of the subsequent data packets, also used for another purpose during processing of each of the subsequent data packets.

\* \* \* \* \*